United States Patent Office 3,523,118
Patented Aug. 4, 1970

3,523,118
PERFLUOROALKYL-s-TRIAZINES
William E. Emerson and Edwin Dorfman, Grand Island, N.Y., assignors to Hooker Chemical Corporation, Niagara Falls, N.Y., a corporation of New York
No Drawing. Continuation-in-part of application Ser. No. 570,183, Aug. 4, 1966, which is a continuation-in-part of application Ser. No. 441,331, Mar. 19, 1965. This application May 1, 1967, Ser. No. 634,849
Int. Cl. C07d 55/50
U.S. Cl. 260—248
6 Claims

ABSTRACT OF THE DISCLOSURE

Novel compounds are selected from at least one member of the group consisting of (1) a first triazine of the formula:

in which $m$ is 1 to 24, provided $m$ is at least 4 when $p$ is zero, in which substituents X, Y and Z are each a halogen selected from the group consisting of fluorine, chlorine, bromine and iodine, provided that at least one of said substituents is different from at least one of the remaining halogen substituents, in which $n$ is 2, 3, 5 to 24 inclusive, and in which $p$ is zero to 3; and (2) a second triazine of the formula:

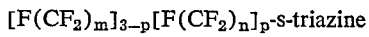

wherein $m$ is 1, 2 or 3, $n$ is 4 through 24 inclusive, and $p$ is 1 or 2; and (3) a nitrile polymer or copolymer in which a perfluoroalkane nitrile selected from the group consisting of perfluoroglutaronitrile, perfluorosuccinonitrile, perfluoroadiponitrile, perfluoromalononitrile, and mixtures thereof is condensed.

The novel triazines are useful as high temperature lubricants and solvents, and the novel nitrile polymers are useful in the preparation of cross-linked highly heat-resistant molded articles.

---

This is a continuation-in-part of Ser. No. 570,183 filed Aug. 4, 1966, now abandoned which is a continuation-in-part of Ser. No. 441,331 filed Mar. 19, 1965, now abandoned.

BACKGROUND OF THE INVENTION

Prior to the filing of this application, triazines have been produced from nitriles by the employment of a catalytic amount of a catalytic composition. For example, U.S. Pat. 3,095,414 employs a combination of ingredients which jointly have a catalytic effect sufficiently to convert a nitrile into a triazine. Another example is copending application Ser. No. 594,997 filed Nov. 17, 1966 which is directed to the novel process of producing triazine by condensing a nitrile in the presence of a metal such as copper, iron, indium, bismuth, lead, tin, thallium, zinc, barium and cadmium.

Literature has been published which discloses that perfluoroalkylenetriazine polymers which do not contain nitrile groups may be cross-linked by reaction with tetraphenyltin. However, it has been discovered that the degree of cross-linking is merely a minor amount and is normally insufficient for practical use in utilities requiring a substantial degree of cross-linking.

An object of this invention is a novel process for producing (1) triazines and/or (2) nitrile polymersfi by the employment of a critical catalyst.

Another object of this invention is a novel composition of polymers or copolymers including a critical catalyst.

Another object is a process of cross-linking particular polymers or copolymers by the employment of a critical catalyst.

Another object is a group of novel triazine compounds and novel nitrile polymers or copolymers.

Another object is a polymer or copolymer composition containing a critical catalyst which makes possible the process of this invention.

Another object is a cross-linked polymer or copolymer composition containing the catalyst of this invention.

Another object is a new use of the polymer or copolymer composition of this invention.

Other objects of this invention become apparent from the above and following disclosure.

THE DESCRIPTION

The present invention relates to a novel process for preparing triazines, nitrile polymers, and cross-linked polymers or copolymers by (1) condensing in the intimate presence of or (2) contacting with a metal oxide, (a) a nitrile or (b) a polymer or copolymer which contains an average of at least more than one nitrile group per molecule of said polymer or copolymer, and relates to novel triazines, nitrile polymers, polymer or copolymer compositions and cross-linked forms of the polymer or copolymer compositions. This invention also includes polymers or copolymers produced by processes other than the processes disclosed herein, provided that the final composition has a catalyst of this invention dispersed therein.

The preceding paragraph refers to the necessity of an average of at least more than one nitrile group per molecule. Thereby, this invention requires (1) that at least one polymer or copolymer molecule contain two nitrile groups and (2) that each molecule contain at least one nitrile group. Any polymer or copolymer molecule that does not contain at least one nitrile group is not a part of those molecules upon which the average of greater than one per molecule is based; a polymer or copolymer not containing a nitrile group would constitute merely a filler material. In a like manner, the language "at least greater than an average of one cyanofluoroalkyl group per molecule" has the same meaning. Also it should be noted that the degree of cross-linking increases with a corresponding increase in the number of nitrile groups per molecule. The optimum number of nitrile groups per molecule will therefore depend upon the properties desired for a particular use. Also, the optimum number of nitrile groups on the molecule depends upon the molecular weight of the polymer or copolymer employed. It should be noted that it is within the scope of this invention to employ polymers or copolymers such as triazine polymers which may be degrad by some means such as by milling, for example, to produce fragments, some of which contain the nitrile groups.

The polymers or copolymers of this invention, and cross-linked forms thereof, i.e., those which contain the catalyst of this invention, are each characterized by novel properties and uses which are distinct from the properties of conventional cross-linked polymers produced by other processes which do not contain the catalyst of this invention. However, in addition to new uses based on the novel properties, the compositions of this invention may be employed for coventional uses of conventional triazines and cross-linked polymers.

Preferred polymers or copolymers include at least greater than an average of one cyanoperfluoroalkyl group per molecule in which the alkylene is methylene, ethylene, propylene, butylene, pentylene, hexylene, heptylene, octylene, nonylene, decylene, and the like. However, higher alkylene groups may be employed.

The novel triazine compounds which may be produced by the process of this invention may be defined as a compound selected from the group consisting of (1) a first triazine of the formula:

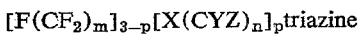

in which $m$ is at least one, provided $m$ is at least 4 when $p$ is zero, in which substituents X, Y and Z are each a halogen selected from the group consisting of fluorine, chlorine, bromine, and iodine, provided that at least one of said substituents is different from at least one of the remaining halogen substituents, in which $n$ is 2, 3, 5, or more, and in which $p$ is zero to 3; and (2) a second triazine of the formula:

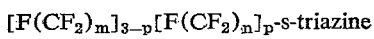

wherein $m$ is 1, 2 or 3, $n$ is 4 through 24 inclusive, and $p$ is 1 or 2; and (3) a nitrile polymer or copolymer in which a perfluoroalkane nitrile selected from the group consisting of perfluoroglutaronitrile, perfluorosuccinonitrile, perfluoroadiponitrile, perfluoromalononitrile, and mixtures thereof is condensed.

The substituent X is preferably bromine or iodine, the substituents Y and Z are each preferably fluorine or chlorine, and $m$ preferably ranges up through about 12 carbons. Typical perhaloalkylene $(C \ldots )_n$ groups are of ethylene, propylene, hexylene, decylene and the like.

Preferred novel compounds are tris(3-bromohexafluoropropyl) triazine, tris(perfluoroheptyl) triazine, bis(trifluoromethyl) perfluoroheptyl triazine, and trifluoromethylbis(perfluoroheptyl) triazine.

The nitrile is of the formula:

wherein Q is selected from the group consisting of

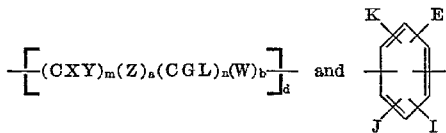

wherein:

(a) X and G are selected from the group consisting of chlorine, fluorine, bromine, and iodine;

(b) Y and L are selected from the group consisting of hydrogen, fluorine, chlorine, bromine, iodine, alkyl of 1 to 20 carbon atoms, haloalkyl of 1 to 25 carbon atoms, aryl of 6 to 20 carbon atoms, perhaloalkyl, perhaloalkenyl of 1 to 25 carbon atoms, nitrile, and cyanoperhaloalkyl;

(c) $m$ and $n$ are integers, the sum of which must be at least one;

(d) Z and W are selected from the group consisting of —CXY—, —CGL—, perhalo lower alkylidene of 1 to 12 carbon atoms, perhalo lower alkylene of 1 to 12 carbon atoms, carbonyl, oxy, sulfinyl, thio, thiocarbonyl, diazo, tetrafluorothio, sulfonyl, alkylene radicals of the formula:

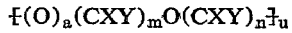

wherein $a$ ranges from 0 to 1, $u$ ranges from 1 to 10, and $m$ and $n$ are as hereinbefore defined, and N-substituted azaalkylene radicals of the formula:

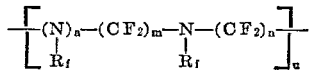

wherein $R_f$ is selected from the group consisting of fluorine and perfluoroalkyl groups of 1 to 12 carbon atoms, and $a$, $u$, (each occurrence) $m$, and $n$ are as herein defined;

(e) $a$ (each occurrence), $b$, and $d$ range from 0 to 1;

(f) P is selected from the group consisting of hydrogen, fluorine, chlorine, bromine, iodine, and nitrile; and (g) E, I, J, and K are selected from the group consisting of hydrogen, fluorine, chlorine, bromine, iodine, alkyl of about 1 to 10 carbon atoms, aryl of 6 to 20 carbon atoms, arylcarbonyl of 6 to 20 carbon atoms and nitrile.

The novel products formed by said process are of the composition including the critical catalyst of this invention dispersed substantially uniformly throughout a compound of the formula $(PQCN)_y$ wherein $y$ is from 2 to 20. If a mononitrile is the starting material, said nitrile will generally all be converted to a triazine when used in the process of this invention. When either the barium oxide or thallium oxide catalyst is used, however, a small amount of the mononitrile will not be converted to the triazine; non-triazine condensation products are formed.

When a di- or polynitrile is the starting material, said nitrile, when used in the process of this invention, is converted into nitrile condensation products, such as dimers, trimers, tetramers, and similar low, medium, and high molecular weight insoluble polymers. If a perfluoroalkane nitrile of 5 to 25 carbons is used, novel triazines are obtained. Similarly, if perfluoroglutaronitrile, perfluorosuccinonitrile, perfluoroadiponitrile, or perfluoomalononitrile is used as a polynitrile, novel non-triazine condensation products are obtained.

A mixture of nitriles may be used to obtain a mixture of triazines. For example, if a mixture of trifluoroacetonitrile and perfluorooctanonitrile is condensed, three different novel triazine products are obtained as shown below, the triazine without the perfluoroheptyl group being old in the art.

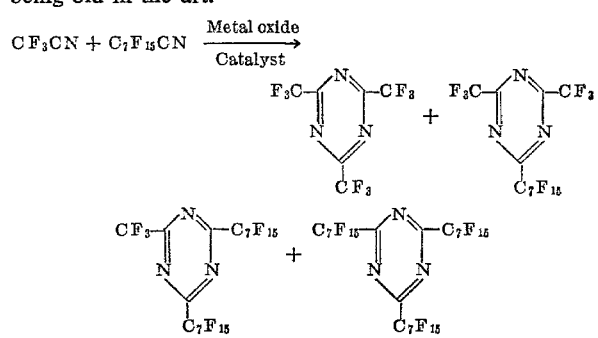

Similarly, if a mixture of dinitriles is condensed, polymers with varying substituents are obtained.

Fluorine is an especially preferred halogen for the X, Y, and Z groups defined above, but the chloro, bromo, and iodo analogs also give good results. When Y or L is perfluoroalkenyl it will preferably contain from 1 to 10 carbon atoms. When Y or L is aromatic, it will preferably be phenyl.

Nitriles especially preferred for use in the process of this invention include those of the formula:

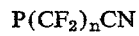

wherein P is as hereinbefore defined and wherein when P is fluorine or chlorine $n$ ranges from 1 to 12, and wherein when P is bromine or iodine, $n$ ranges from 2 to 12; those of the formula:

wherein D is selected from the group consisting of oxygen, tetrafluoro-sulfur groups, and wherein $n$ and $m$ range from 1 to 12, and P is as hereinbefore defined; and those of the formula

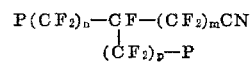

wherein $p$, $n$, and $m$ range from 1 to 12, and wherein P is as hereinbefore defined. Some of the especially preferred nitriles represented by said formulae include perfluorobutyronitrile,
difluoroacetonitrile,
difluorochloroacetonitrile,
perfluoroglutaronitrile,
perfluorosuccinonitrile,
trifluoroacetonitrile,
pentafluoropropionitrile,
perfluoromalononitrile,
bromotetrafluoropropionitrile, bromooctafluorovaleronitrile,
nonafluoro-3-thiabutyronitrile,
perfluoroethyladiponitrile,
perfluorosuberonitrile,
perfluorosebaconitrile,
perfluorovaleronitrile,
4-bromohexafluorobutyronitrile,
perfluoroadiponitrile,
perfluorotetradecanedinitrile,
perfluoromethoxypropionitrile,
perfluoroethoxypropionitrile,
trichloroacetonitrile, and
perfluorooctanonitrile.

Other nitriles which are operative in the process of this invention include, e.g., perfluorocapronitrile;
3,4-dibromopentafluorobutyronitrile;
trifluoromethylbenzonitrile;
chlorobenzonitrile;
dichlorobenzonitrile;
polychlorobenzonitriles;
perfluorododecane nitrile;
perfluorotetradecane nitrile;
perfluorostearonitrile;
benzonitrile;
2-nitro-4-trifluoromethylbenzonitrile;
perfluorooleonitrile;
m-(trifluoromethylbenzoyl)benzonitrile;
2-phenyl-2,4,4,4-tetrafluoroacetoacetonitrile;
perfluorobenzonitrile;

nitriles of the formula:

$$R'_fO-\left(\underset{CF}{\overset{R_f}{|}}\right)_m-CN$$

wherein $m$ is one or more, wherein $R_f'$ is lower perfluoroalkyl and $R_f$ is selected from the group consisting of fluorine, and perfluoroalkyl of from 1 to 12 carbon atoms, such as $$CF_3OCFCN, \quad C_2F_5OCF_2CN$$
$$\overset{|}{CF_3}$$

$$C_3F_7OCFCN, \quad CF_3OCF_2CF_2CN, \quad CF_3CF_2OCFCN$$
$$\overset{|}{C_2F_5} \qquad\qquad\qquad\qquad\qquad\qquad \overset{|}{CF_3}$$

and the like; nitriles of the formula $$T(R_f'')O(CF_2)_nCN$$

wherein T is selected from the group consisting of hydrogen and halogen, $R_f''$ is perfluoroalkylene of 1 to 12 carbon atoms, and $n$ is from 1 to 10, such as $$C_2F_5OCF_2CN, \quad H(CF_2)_3O(CF_2)_2CN$$

$$\underset{CF_3}{\overset{CF_3}{\diagdown}}CF-CF_2O(CF_2)_3CN, \quad BrCF_2CF_2O(CF_2)_4CN$$

perfluoroisobutyloxypropionitrile,
perfluorohexyloxypropionitrile,
perfluorooctyloxypropionitrile, and the like; and mixtures of the aforementioned nitriles.

The catalysts employed in the process of this invention are oxides of the metals of Groups I-B, II-A, II-B, III, IV, V, VII-B, and VIII of the Periodic Table, preferably those of Groups I-B, II-A, II-B, III, IV-A, and V-A. Among the especially preferred metal oxide catalysts are silver oxide, mercuric oxide, cupric oxide, cadmium oxide, the oxides of lead, red lead oxide ($Pb_3O_4$), antimony oxide, barium oxide, cuprous oxide, thallium oxide, and zinc oxide. The catalysts of this invention may be used in any catalytic amount from 0.01 to 10 percent by weight of the nitrile to be condensed. Preferably, the catalyst will be employed in an amount between 0.05 to 6 percent by weight of the nitrile to be condensed. The above catalysts of this invention may be used alone or in combination, for the invention disclosed herein.

The nitrile condensation reaction may be run in any solvent which does not react with the nitrile, the catalyst, or the reaction products of the nitrile and catalyst. Suitable solvents include, e.g., n-butyl acetate, carbon tetrachloride, ortho-chlorotoluene, chlorobenzene, nitrobenzene, cyclohexanone, ortho-dichlorobenzene, diethylcarbitol, dimethylsulfoxide, dioxane, ethyl acetate, and the like. This list is merely illustrative, and does not purport to describe the vast number of solvents which can be used in the process of this invention.

The novel process of this invention for producing the triazines, nitrile polymers and cross-linked polymers or copolymers is operable at a temperature of from 0 to 400 degrees centigrade, though it is preferred to work in the 25 to 250 degrees centigrade range, and an even more preferred temperature range is that of from about 25 to 190 degrees centigrade. The process of this invention is operable at atmospheric or autogenous pressures.

The reaction time is dependent on the catalyst employed, the amount of catalyst employed, the temperature at which the reaction is carried out, and the degree of conversion desired. Reaction times of from about four hours to about seven days are satisfactory.

The triazines, nitrile polymers, and cross-linked polymers or copolymers produced by the above process of this invention are useful in applications (uses) requiring high temperature stability. The novel triazines of this invention are useful both as high temperature lubricants and solvents, and the nitrile polymers produced by the above process whent a dinitrile is condensed, and which contain the critical catalyst of this invention, are useful in the preparing of cross-linked highly heat-resistant molded articles.

A novel mixture of this invention useful in preparing a cross-linked polymer or copolymer composition, and useful for employment as a high temperature sealant includes a polymer or copolymer in combination with the metal oxide catalyst of this invention. In a second novel mixture, the above polymer or copolymer is a cross-linked structure.

The novel process of this invention includes the steps of curing, i.e. cross-linking a polymer or copolymer described above containing a sufficient number of nitrile groups, the curing being (1) at a sufficiently elevated temperature and for a period sufficiently long and (2) in the intimate presence of the above described critical catalyst of this invention, to cross-link (vulcanize) to form a cross-linked polymer or a cross-linked copolymer.

The cross-linking process of this invention may (for example) employ any polymeric composition having at least greater than an average of one cyanohaloalkyl group per molecule in the novel presence of a catalytic amount of the catalyst of this invention to crosslink to form a cross-linked polymer or copolymer. The cross-linked former-cyano-group-containing polymers and copolymers of the novel curing process exhibit novel properties. The particular properties depend, for example, upon which particular catalyst of this invention is employed, the filter employed, the polymer or copolymer molecular weight, the number of nitrile groups on the molecule and the like.

The degree of cross-linking for polymers and copolymers of this invention has been found to typically depend on the number of cyanohaloalkyl groups along the polymer chain, the amount of catalyst used, and on the time and the temperature range which is used in the curing process of the polymer. The polymers which have been cross-linked by this method have been perfluoroalkylenetriazine polymers of a wide range of molecular weight. The particular curing temperature necessary typically depends upon which catalyst is employed, the amount of catalyst employed, the particular polymer or copolymer, and the duration of curing. Normally the curing temperature is at least about 25° C., up to about 200° C., for example, preferably up to about 150° C.

Lower molecular weight perfluoroalkylenetriazine polymers which have nitrile groups only at the polymer chain ends have been cured catalytically. Perfluoroalkylenetriazine polymers which have cyanoperfluoroalkyl groups at the 6 position of the triazine ring have also been successfully cured. The percentage of cyanoperfluoroalkyl groups at the 6 position of the triazine ring on these polymer molecules may vary from less than 1 percent up to 100 percent. A preferred percentage is from about 3 percent to 20 percent of nitrile-containing groups in the 6 position of the triazine ring. Perfluoroalkylenetriazine polymers have been described in our copending application U.S. Ser. No. 533,430, which disclosure is hereby incorporated by reference.

Other fluorine-containing polymers such as the tetrafluoroethylene-trifluoronitrosomethane copolymers might also be cured by these catalytic curing processes. Perfluoroalkylene ether polymers, perfluoropropylene-vinylidene fluoride copolymers, fluoroalkyl silicone polymers, and the like also may be cured by the catalyst.

The following examples are not intended to limit the invention disclosed herein except to the extent that limitations are specifically stated or to the extent to which limitations appear in the appended claims. The invention is illustrated by the following non-limiting examples in which temperatures are expressed in degrees centigrade, and parts are by weight, unless otherwise indicated.

EXAMPLE 1

To a glass autoclave containing one part of silver oxide were charged 130 parts of perfluorobutyronitrile. The vessel was sealed under nitrogen and heated at 70 degrees centigrade, the pressure being approximately 115 pounds per square inch gauge. After 24 hours, the pressure had dropped to approximately 105 pounds per square inch gauge. Thereupon, the temperature was raised to 80 degrees centigrade and maintained there for the next six days while the pressure gradually dropped to approximately 20 pounds per square inch gauge. The autoclave was then cooled, the pressure was reduced to zero pounds per square inch gauge, and thereafter the autoclave was opened and the contents were filtered. The product was distilled at 42 to 45 degrees centigrade and a pressure of one millimeter of mercury to obtain 128 parts product which was identified by its infrared absorption spectrum as tris (perfluoropropyl) triazine. The residue contained 0.2 part of silver oxide.

EXAMPLE 2

One part of silver oxide and 100 parts of perfluorooctanonitrile were heated at 110 degrees centigrade for a period of four days. Tris(perfluoroheptyl)triazine with a boiling point of 130 degrees at 0.025 millimeter of mercury, was recovered by distillation in 93 percent yield. It was characterized by infrared absorption at 1550 reciprocal centimeters for the triazine ring and 1200–1250 reciprocal centimeters for the C—F absorptions.

EXAMPLE 3

Example 2 was repeated except that five parts of silver oxide were used. The reaction was completed in eight hours and the same product was recovered with substantially the same yield.

EXAMPLE 4

Using the procedure of Example 1, ten parts of perfluoro glutaronitrile were condensed in a glass autoclave containing 0.1 part of silver oxide catalyst. The resulting yellow-white compound had typical —C=N—C=N— infrared absorption bands at 1624 and 1690 reciprocal centimeters. The melting point of the sublimate began at 125 degrees centigrade. The recrystallized compound melted at 159 degrees. The intrinsic viscosity of the crude product in 1,2-dimethoxyethane was 0.03 deciliters per gram.

EXAMPLE 5

Example 4 was repeated except that the catalyst was mercuric oxide. Substantially the same physical data were obtained for the resulting product.

EXAMPLE 6

Example 4 was repeated except that the catalyst was cupric oxide. Again, substantially the same physical data were obtained for the resulting product.

EXAMPLE 7

To an autoclave containing 5.6 parts of silver oxide were charged 50 parts of benzonitrile. The temperature was maintained at approximately 115 degrees centigrade for 132 hours. The reaction product was 2,4,6-tris (phenyl)-1,3,5-triazine.

In a like manner perfluorobenzonitrile was condensed by the procedure of Example 7.

EXAMPLE 8

Example 2 was repeated except that the catalyst was cadmium oxide. The reaction was allowed to proceed for 22 hrs. at 190° C. The reaction product was identified by an infrared absorption spectrum to be tris(perfluoroheptyl)triazine, in 100% yield and 87% conversion.

EXAMPLE 9

Example 2 was repeated except that the catalyst was red lead oxide ($Pb_3O_4$). Again, the reaction was allowed to continue for 20 hrs. at 190° C. after which the reaction product was identified as being the same as the reaction product of Examples 2 and 8. The yield and conversion were about 100%.

The product of Examples 4, 5 and 6 is useful in preparing molded objects having high thermal stability which are useful as fittings, couplings and gaskets by the application of heat. The products of Examples 1 through 3 and 7 through 9 are useful as high temperature oils and solvents.

EXAMPLES 10–30

In the following examples, unless otherwise noted under the "Comments" section, 3.56 parts of perfluorooctanonitrile were reacted with the specified catalyst for 20 hours at a temperature of 190 degrees centigrade. The yield of triazine was calculated from the percent of nitrile reacted.

| Ex. | Catalyst | Parts of catalyst | Percent nitrile reacted | Percent yield of triazine | Comments |
|---|---|---|---|---|---|
| 10 | $As_2O_3$ | 0.089 | (1) | 100 | 110 degrees, 69 hours. |
| 11 | $Bi_2O_3$ | 0.210 | 0.5 | 100 | |
| 12 | CaO | 0.050 | (1) | 100 | |
| 13 | $Ag_2O$ | 0.104 | 100 | 100 | 110 degrees. |
| 14 | $Ag_2O$ | 0.104 | 3 | 100 | 25 degrees, 30 days. |
| 15 | $Co_2O_3$ | 0.075 | 0.3 | 100 | |
| 16 | CuO | 0.072 | 0.8 | 100 | |
| 17 | $Fe_2O_3$ | 0.072 | (1) | 100 | 110 degrees. |
| 18 | HgO | 0.195 | 0.2 | 100 | |
| 19 | PbO | 0.201 | 70 | 100 | |
| 20 | $PbO_2$ | 0.215 | 5 | 100 | |
| 21 | $Cu_2O$ | 0.032 | 41 | 100 | |
| 22 | BaO | 0.138 | 100 | 85 | Rest unknown. |
| 23 | $Sb_2O_3$ | 0.131 | 0.5 | 100 | |
| 24 | $Sb_2O_5$ | 0.146 | 8 | 100 | Small amount unknown. |
| 25 | $TiO_2$ | 0.072 | 0.2 | 70 | Rest unknown, 110 degrees for 260 hours. |
| 26 | $Tl_2O_3$ | 0.206 | 42 | 100 | Small amount unknown. |
| 27 | $V_2O_5$ | 0.082 | 0.2 | 100 | |
| 28 | $Y_2O_3$ | 0.102 | (1) | 100 | Small amount unknown. |
| 29 | ZnO | 0.073 | 2.3 | 100 | |
| 30 | $Mn_3O_4$ | 0.069 | 0.2 | 100 | Small amount unknown. |

¹ Trace.

EXAMPLE 31 (EXPERIMENTS 1 and 2)

In the following experiments as set forth in Table II below, a perfluoroalkylenetriazine polymer containing from one to twenty cyanoperfluoropropyl groups for every ninety-nine to eighty perfluoropropyl groups respectively in the polymer chain was mixed with about 5 percent by weight of catalyst (1 g. polymer per 0.05 g. catalyst). The mixtures were then heated for the periods of time indicated, then tested for solubility in hexafluoroxylene which dissolves uncrosslinked perfluoroalkylenetriazine polymers but not the crosslinked polymers.

Vulcanization (i.e., curing or crosslinking) usually occurs at temperatures ranging from about 25° to about 150° centigrade. Postcuring often increases the tensile strength of the vulcanized polymer. For barium oxide and zinc oxide, Table II discloses the process conditions and evidence of a cross-linked product.

TABLE II

| Exp. No. | Catalyst | Temp. (° C.) | Time (hrs.) | Solubility |
|---|---|---|---|---|
| 1 | Barium oxide | 150 | 97 | Insoluble. |
| 2 | Zinc oxide | 150 | 97 | Do. |

EXAMPLE 32

A poly(perfluorooctamethyleneperfluoropropyltriazine) containing cyanoperfluoropropyl groups was prepared by addition of 0.72 part of 4-cyanoperfluorobutyryl chloride to 10 parts of poly(perfluorooctamethylenetriazapentadiene), in 37 parts of dimethoxyethane, with the subsequent addition of 77 parts of perfluorobutyric anhydride. The product was recovered after removal of solvent and volatile byproducts by distillation and by drying at 150 degrees centigrade at 0.24 mm. mercury pressure to give 9.6 parts of polymer containing nitrile groups as shown by an infrared absorption spectrum.

A mixture of silver oxide powder, 0.1 part, and, 2.0 parts of the polymer prepared above was heated for 10 minutes at 200 degrees centigrade. After this time it was no longer fluid nor soluble in hexafluoroxylene, showing that vulcanization had occurred. A control sample, free of silver oxide, was still fluid after 10 minutes in the oven.

EXAMPLE 33

The general procedure of Example 32 was followed to cross-link (vulcanize) ω-cyanohexafluoropropyl-pendant triazine polymer in five consecutive experiments (1–5) employing silver oxide ($Ag_2O$) with triazine polymers having varying amounts of cyano groups therein. Polymers a through e were produced by approximately having more cyano reactant introduced for b than for a, more for c than for b, more for d than for c and more for e than for d; however, due to less than completely reliable analytical methods, the relative amount of cyano reactant introduced is not necessarily conclusive evidence that the triazine polymer contains that relative amount of cyano groups. The properties of the resulting cross-linked products are disclosed in Table III.

EXAMPLE 34

In an additional series of experiments, following a procedure identical to Examples 10–30, (A) in two separate experiments employing BaO and ZnO at 5 mole percent based on nitrile, respectively, 3–8 parts of $Br(CF_2)_3CN$ produced 100% yield and conversion, respectively, of a novel compound, tris(3-bromohexafluoropropyl)triazine, and (B) in two other separate experiments employing the above catalysts, respectively, 2.88 parts of $CCl_3CN$ produced 90% yield and conversion, respectively, of tris(trichloromethyl)triazine.

Various changes and modifications may be made in the method of this invention, certain preferred forms of which have been described and equivalences may be substituted without departing from the spirit and scope of this invention.

What is claimed is:

1. A compound selected from the group consisting of (1) a first triazine of the formula:

$$[F(CF_2)_m]_{3-p}[X(CYZ)_n]_p\text{-s-triazine}$$

in which m is 1 to 24, in which substituents X, Y and Z are each a halogen selected from the group consisting of fluorine, chlorine, bromine and iodine, wherein each X, Y and Z is the same as every other X, Y and Z respectively and at least one of said substituents is different from at least one of the remaining halogen substituents, in which n is 5 to 24 inclusive, and in which p is 1 to 3; and (2) a second triazine of the formula:

$$[F(CF_2)_m]_{3-p}[F(CF_2)_n]_p\text{-s-triazine}$$

wherein m is 1, 2 or 3, n is 7 through 24 inclusive, and p is 1 or 2.

2. A triazine of the formula:

$$[F(CF_2)_m]_{3-p}[X(CYZ)_n]_p\text{-s-triazine}$$

in which m is 1 to 24, in which X is selected from the group consisting of bromine and iodine and in which Y and Z are each selected from the group consisting of fluorine and chlorine, in which n is 2, 3, 5 to 24 inclusive and in which p is 1 to 3.

3. A triazine of the formula:

$$[F(CF_2)_m]_{3-p}[X(CYZ)_n]_p\text{-s-triazine}$$

in which X is bromine, in which Y and Z are fluorine, in which m is 1 to 12 inclusive, in which n is 2, 3, 5 to 24 inclusive, and in which p is 1 to 3.

4. Bis(trifluoromethyl)perfluoroheptyl-s-triazine.
5. Trifluoromethylbis(perfluoroheptyl)-s-triazine.
6. Tris(3-bromohexafluoropropyl)-s-triazine.

TABLE III

| Triazine of polymer | Weight percent of silver oxide | Temp. of cure (° C.) | Time of of cure | Tensile strength (p.s.i.) | Elongation percent | Hardness Shore "A" |
|---|---|---|---|---|---|---|
| a | 10 | 160 | 3 | 1,030; 1,440 | 75; 70 | 70 |
| b | 10 | 160 | 3 | 567 | 170 | 68 |
| c | 10 | 160 | 3 | 970 | 120 | 71 |
| d | 10 | 160 | 3 | 830; 600 | 170; 200 | 62 |
| e | 10 | 160 | 3 | 200 | 200 | 50 |

References Cited

UNITED STATES PATENTS

| 2,525,714 | 10/1950 | Norton | 260—248 |
| 2,981,734 | 4/1961 | Ratz et al. | 260—248 |
| 3,218,270 | 11/1965 | Delman et al. | 260—248 XR |
| 3,407,232 | 10/1968 | Mitsch | 260—248 XR |
| 3,086,946 | 4/1963 | Brown | 260—248 XR |
| 3,347,901 | 10/1967 | Fritz et al. | 260—78.4 |
| 3,369,002 | 2/1968 | Griffin | 260—248 XR |

OTHER REFERENCES

Zaitseva et al., Chemical Abstracts, Cols. 8748h to 8749 (1963) vol. 59.

Hymes et al., Jour. Amer. Chem. Soc. vol. 85, pp. 83–6 (1963).

HENRY R. JILES, Primary Examiner

J. M. FORD, Assistant Examiner

U.S. Cl. X.R.

260—78.4; 252—51, 78